US012442249B2

(12) United States Patent
Cullmann

(10) Patent No.: US 12,442,249 B2
(45) Date of Patent: Oct. 14, 2025

(54) NARROW INGRESS AND EGRESS STEP ASSEMBLY AND METHODS FOR ACCESSING LIFTED BOAT IN A COVERED DOCK

(71) Applicant: Ryan Charles Cullmann, St. Charles, MO (US)

(72) Inventor: Ryan Charles Cullmann, St. Charles, MO (US)

( * ) Notice: Subject to any disclaimer, the term of this patent is extended or adjusted under 35 U.S.C. 154(b) by 865 days.

(21) Appl. No.: 17/696,375

(22) Filed: Mar. 16, 2022

(65) Prior Publication Data

US 2023/0295987 A1 Sep. 21, 2023

(51) Int. Cl.

| | |
|---|---|
| ***E06C 9/02*** | (2006.01) |
| ***B63C 1/00*** | (2006.01) |
| *B66B 9/08* | (2006.01) |
| *B66F 11/04* | (2006.01) |
| *B66F 13/00* | (2006.01) |
| *E04F 11/104* | (2006.01) |

(52) U.S. Cl.

CPC .................. *E06C 9/02* (2013.01); *B63C 1/00* (2013.01); *B66B 9/083* (2013.01); *B66B 9/0846* (2013.01); *B66F 11/042* (2013.01); *B66F 13/00* (2013.01); *E04F 11/1041* (2013.01)

(58) Field of Classification Search

None

See application file for complete search history.

(56) References Cited

U.S. PATENT DOCUMENTS

| | | | | | |
|---|---|---|---|---|---|
| 419,228 | A | | 1/1890 | Spelman | |
| 3,310,132 | A | * | 3/1967 | Rolland | E04F 11/028 182/189 |
| 3,467,220 | A | * | 9/1969 | Harley | E04F 11/028 182/115 |
| 4,037,686 | A | * | 7/1977 | Shull | E06C 9/085 182/160 |
| 4,106,591 | A | * | 8/1978 | Cohen | E04F 11/028 182/100 |
| 4,199,040 | A | * | 4/1980 | Lapeyre | B63B 29/20 182/189 |

(Continued)

FOREIGN PATENT DOCUMENTS

| | | |
|---|---|---|
| BE | 1025230 B1 | 12/2018 |
| CN | 101028903 B | 11/2010 |

(Continued)

OTHER PUBLICATIONS

Pylex 2-Step Steel Stair Stringers; Item #2656095Model #13902; www.lowes.com; retrieved Mar. 16, 2022.

(Continued)

*Primary Examiner* — Phi D A

(74) *Attorney, Agent, or Firm* — Armstrong Teasdale LLP

(57) ABSTRACT

A step assembly includes a horizontally extending mounting foot section, a vertically extending head section, a single sloping support member interconnecting the mounting foot section and head section, and a step member having a number of integrally formed horizontal steps extending above and attached to the single sloping support member. The step assembly is narrow in a width dimension for use on a narrow dock section, and the horizontal steps are configured to facilitate personal access to a raised boat on a lift.

20 Claims, 11 Drawing Sheets

(56) References Cited

U.S. PATENT DOCUMENTS

| | | | | | |
|---|---|---|---|---|---|
| 4,316,524 | A * | 2/1982 | Lapeyre | E06C 7/183 | 182/99 |
| 4,328,880 | A * | 5/1982 | Lapeyre | E04F 11/0201 | 182/99 |
| 4,509,617 | A * | 4/1985 | Lapeyre | E04F 11/0201 | 182/228.2 |
| 4,535,871 | A * | 8/1985 | Lapeyre | E06C 1/381 | 182/189 |
| 4,586,585 | A * | 5/1986 | Zaner | E04F 11/0255 | 182/206 |
| 4,719,989 | A * | 1/1988 | Ritten | B63B 27/14 | 182/206 |
| 4,981,195 | A * | 1/1991 | Merrick | E04F 11/0201 | 182/189 |
| 5,010,699 | A * | 4/1991 | Maiuccoro | E04F 11/025 | 52/169.8 |
| 11,945,692 | B1 * | 4/2024 | Young | B66B 9/0853 | |
| 2004/0074167 | A1 | 4/2004 | Drost | | |
| 2006/0272083 | A1 * | 12/2006 | Kruger | A01K 1/035 | 4/496 |

FOREIGN PATENT DOCUMENTS

| | | | | |
|---|---|---|---|---|
| CN | 102383552 | A | | 3/2012 |
| CN | 103195215 | A | | 7/2013 |
| CN | 105882894 | A | | 8/2016 |
| CN | 106097876 | A | | 11/2016 |
| CN | 205743939 | U | | 11/2016 |
| CN | 109972801 | A | | 7/2019 |
| CN | 210316277 | U | | 4/2020 |
| CN | 210597918 | U | | 5/2020 |
| CN | 111335562 | A | | 6/2020 |
| CN | 211058182 | U | | 7/2020 |
| CN | 211257604 | U | | 8/2020 |
| CN | 111663728 | A | | 9/2020 |
| CN | 212336567 | U | | 1/2021 |
| DE | 19632301 | A1 | | 9/1997 |
| DE | 202007019369 | U1 | | 4/2012 |
| FR | 2487423 | A1 | * | 7/1980 |
| GB | 854576 | A | * | 11/1960 |
| JP | 11022129 | A | | 1/1999 |
| JP | 2000230303 | A | | 8/2000 |
| JP | 2015094197 | A | | 5/2015 |

OTHER PUBLICATIONS

NPL; Item #2656100Model #13907; www.lowes.com; retrieved Mar. 16, 2022.

* cited by examiner

NARROW INGRESS AND EGRESS STEP ASSEMBLY AND METHODS FOR ACCESSING LIFTED BOAT IN A COVERED DOCK

BACKGROUND OF THE INVENTION

The field of the invention relates generally to ingress and egress step assemblies for accessing an elevated structure, and more specifically to an ingress and egress step assembly for accessing a boat that is raised on a lift while docked.

Various types of step and stair assemblies are known and in widespread use for ingress and egress purposes by persons to access and return from elevated structures that are otherwise difficult, if not impossible, for most persons to safely navigate to and from without assistance. Using such step and stair assemblies, persons can incrementally ascend or descend in elevation using the steps provided. In some cases, stairs and steps are built-in to the design of a structure, while in other steps and stairs are separately provided and can used as freestanding, portable structures. In still other cases, step and stair assemblies may designed or fabricated, including custom-designed fabrication, as add-on, retrofit assemblies that can be attached to an existing structure.

Known retrofit step assemblies tend to be too large, too complicated and too expensive for use in certain locations, including but not necessarily limited to boat docks wherein access to a boat in the dock can sometimes be challenging. Improved step assemblies are therefore desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

In order to understand the invention to its greatest extent, a background discussion of the state of the art and certain problems associated therewith is set forth below, followed by a description of exemplary embodiments of the present invention that advantageously overcome such problems.

Marine vessels such as recreational boats and powered watercraft can be stored in docks on bodies of water when the marine vessels are not in use. Docks may be rented or purchased and owned, and conveniently provide short term and long term boat storage in the boating season that avoids, for example, trailering of a boat and repeatedly launching and removing the boat into and out of the body of water in between actual use of the boat away from the dock. Boat lifts are also available for use with the covered and uncovered docks to raise boats out of the water when desired in the dock. Boat lifts and covered docks are in widespread use on freshwater and saltwater lakes, rivers and other coastal waterways, but they can present certain issues to watercraft owners that would desirably be avoided.

Figure 1:
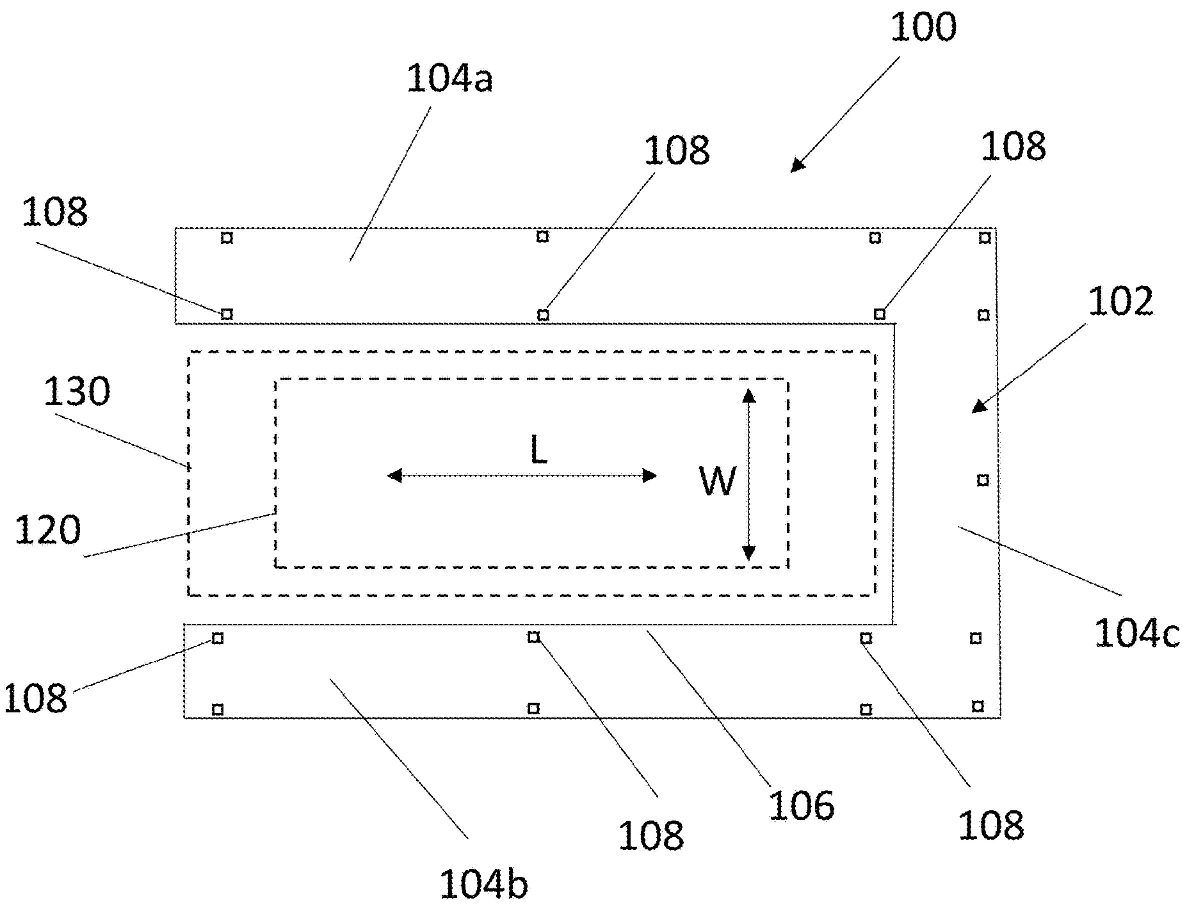
FIG. 1 is a top partial top view of an exemplary covered dock including a lift mechanism for a marine vessel.
Figure 2:
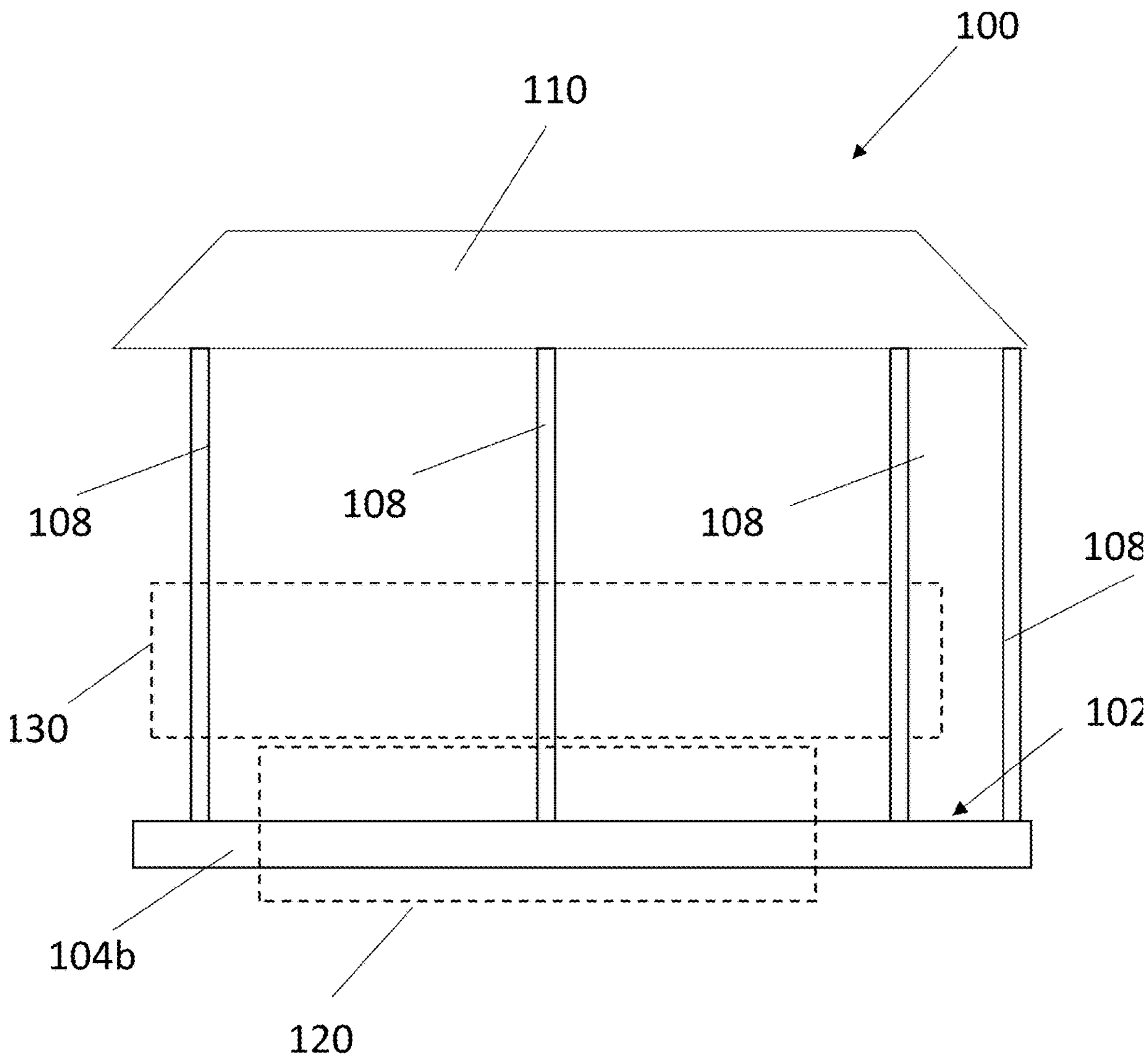
FIG. 2 is a side elevational view of the exemplary covered dock and lift mechanism shown in FIG. 1.

FIGS. 1 and 2 respectively show a top partial top view and side elevational view of an exemplary covered dock 100 including a deck 102 extending over a waterline of a body of water. The deck 102 is typically a floating deck that is self-adjusting with fluctuation of the water level over time, although in some cases the deck 102 could instead be fixed in place at a desired elevation with piers and the like. Either way, the deck 102 defines a walking surface for persons, possible seating surfaces, and/or usable space to place items at an overwater location distanced from the shoreline of the body of the water. The water has sufficient depth to navigate marine vessels and facilitate swimming or fishing in the vicinity of the dock 102.

In the example shown, the deck 102 is defined in three sections 104*a*, 104*b*, 104*c*. Deck sections 104*a*, 104*b* extend generally straight and parallel to one another, while deck section 104*c* extends perpendicular to the deck sections 104*a* and 104*b* at end thereof, defining a generally U-shaped deck surface in combination. The inner periphery of the U-shaped deck surface defines an internal U-shaped space or cavity that is sometimes referred to as a slip or well 106. The slip or well 106 is sized to receive a mechanical lift mechanism 120 and a boat 130 between the deck sections 104*a*, 104*b*. or alternatively the lift mechanism 120 and boat 130 are selected with a size that fits within the slip or well 106.

The deck sections 104*a*, 104*b* extend longitudinally alongside the opposing side edges of the lift mechanism 120 and the boat 130 in a manner substantially parallel to an axial length L of the lift mechanism 120 and the boat 130. The deck section 104*c* extends laterally between the deck sections 104*a*, 104*b* at the front end of the lift mechanism 120 and the forward end of the boat 130 in a width dimension W. The width dimension W extends transversely across the lift mechanism 120 and the boat 130 and generally perpendicular to the length dimension L. By virtue of this arrangement of deck sections 104*a*, 104*b*, 104*c*, a person can therefore walk on the deck 102 around the front and sides of the lift mechanism 120 and the boat 130 on the respective deck sections 104*a*, 104*b*, 104*c*.

Depending on the type of boat 130, the forward end of the boat 130 is sometimes referred to as the bow, as specifically distinguished from rear of the boat that is commonly referred to as the stern. The opposing sides of the boat 130 between the bow and the stern may in turn be referred to as the port side and starboard side. The stern of the boat 130 typically includes the marine propulsion system, which in many boats includes at least one propeller extending from the stern. The marine propulsion system may be an inboard system, an outboard system or a combination inboard/ outboard system. Different types of boats 120 are known and may be used with the dock 100, including but not necessarily limited to pontoon boats, fishing boats, runabouts and powerboats (e.g., bowriders, deckboats, jet boats, ski boats, etc.). Many different types of boats, and many different sizes of boats, may be used with the dock 100 provided that the length and width dimensions of the boat 130 do not exceed the dimensions of the slip or well 106.

Similarly, many types of lift mechanisms 120 are known for use with different types of boats 130, with the only limitation being that the lift mechanism 120 is dimensionally compatible with the boat 130 and has capacity to lift the weight of the boat 130 entirely out of the water when desired. The lift mechanism 120 is alternately lowered sufficiently below the waterline so that the boat 130 may float on the water and may be powered in or out of the slip 106, or raised to lift the entirety of the boat 130 well above the waterline and in most cases well above the deck 102. In the raised position, the boat 130 is held completely out of the water to beneficially keep the boat 130 clean and dry in time of non-use, as well as to reduce maintenance requirements to the boat 130 that would otherwise be needed if the boat 130 was alternatively kept in the water when not in use. This is particularly so for saltwater locations. Lifts are also available for personal watercraft that can be docked in the slip 106. Depending on the configuration of the dock 100, more than one marine vessel of the same or different type may be stored in the dock 100 with or without a lift.

Each of the deck sections 104*a*, 104*b*, and 104*c* includes a number of posts 108 extending upward from the deck sections 104*a*, 104*b*, and/or 104*c* adjacent the slip or well 106 to support a roof structure 110 (FIG. 2) in the example shown. The number of posts 108 and positions of the posts 108 relative to one another and also relative to the slip or well 106 may vary in different configurations of the dock 100, but typically there will be one or more posts 108 on each deck section 104*a* and 104*b* alongside the slip 106 to support a roof structure 110 overhead the boat 130. By virtue of the roof 110, the boat 130 is covered when docked and the dock 100 is therefore referred to as a covered dock that protects the boat 130 from sun and precipitation when the boat 130 is not being used. When actuated, the lift mechanism 120 securely holds the watercraft in a stable, lifted position relative to the dock 100 that is generally unaffected by wind and waves. Watercraft owners may therefore protect their watercraft investments in a safe and secure manner via the covered dock 100 and the lift mechanism 120.

While the dock 100 illustrated in FIGS. 1 and 2 includes one slip 106, additional slips may be included in further and/or alternative embodiments. Any number of n slips may be provided using similar decking sections to those shown such that all of the n slips are covered by the roof 110 that is supported by posts 108 distributed throughout the decking sections that define the slips. On any given body of water, a single covered slip (i.e., only ones lip) may be located in a dock adjacent private residences, two or more covered slips may be located in docks adjacent private residences for owners of more than one boat or for different types of watercraft, groups of covered slips (e.g., eight or more) may be provided in larger docks for area homeowners or owners or renters of slips that do not necessarily live in the vicinity of the dock, and large numbers of covered slips may be defined in marinas having multiple covered dock sections that are connected to one another.

Docks 100 provided with lift mechanisms 120 such as those described above desirably protect boats 130 in periods of on-use, but can be inconvenient in some aspects. Many boat owners have over the course of ten to thirty minutes or more, for example, docked their boat, packed their belongings and cleaned or organized the interior of the boat after a boating excursion, applied any coverings fitted to the boat itself, operated the lift to raise the boat from the water, and perhaps wiped down the exterior of the boat before departing from the dock, only to find after doing all of this that they need to access the boat to retrieve an item from the inside. For example, one or more of the boat owners, boat drivers or riders, may have inadvertently left a wallet, the keys to the boat, car keys, sunglasses, etc. inside the boat. Once the boat 130 is raised on the lift mechanism 120, however, the upper portion of the boat 130 that is required to access its interior may extend well above the deck 102 (up to about 60 inches in contemplated examples) of the dock 100, and the few options for a person to access the boat 130 in this situation are each inherently disadvantaged.

First, the lift mechanism 120 can be lowered either partially or completely so that the boat 130 is lowered to a level where it can be easily accessed by a person from the deck 102 of the dock 100 in an unassisted manner. When the water is rough, however, lowering of the lift mechanism 120 could result in undesirable damage to the lift mechanism 120 and/or the boat 130. Further, it can take an extended amount of additional time to lower the lift mechanism 120 and raise it again to secure the boat 130 in the desired position after retrieving an item from the boat 130. Of course, avoidance of possible damage to the boat 130 or lift mechanism 120 and additional time to lower and raise the lift mechanism 120 again would preferably be avoided.

Second, one can climb on the structure of the lift mechanism 120 to try and access the forward portion or the rear of the boat 130 from the lift mechanism 120 while the boat 130 remains fully lifted. This tends to be inherently dangerous, however, because the lift mechanism 120 is likely to be slippery, making it very difficult to get into the boat 130. Climbing on the lift mechanism 120 is therefore not recommended.

Third, one can attempt to climb on the rear platform of the boat 130 to obtain access to the interior of boat 130 while the boat 130 remains fully lifted. This can also be dangerous and therefore inadvisable. If one were to slip and fall on the outdrive or propeller of the boat near the rear platform, serious injury could result.

If one is able to successfully access the boat 130 while it is fully lifted, safely exiting the boat 130 presents still further issues. Jumping from any portion of the elevated boat 130 to the deck 102 below poses injury risks. The larger the boat 130 the taller it will be when raised on the lift mechanism 120, and jumping from the boat 130 to the deck 102 without injury becomes increasingly risky the higher the boat 130 is actually lifted above the deck 102.

Attempts to climb down one of the sides of the boat 130 or of the lift mechanism 120 to exit the fully lifted boat 130 likewise also poses risk of injury. Aside from falling on the deck 102 or a portion of the lift mechanism 120 and being injured, one could potentially fall into the slip 106 and become entangled in the lift mechanism 120 or wedged between the lift mechanism 120 and one of the deck sections 104*a*, 104*b*, possibly while being submerged in the water.

A ladder is a potential solution to the problem of accessing a lifted boat, but not a good one. The ladder would need to be on site when needed and would therefore need to be stored on the dock 100 outside of the boat 130, but for many reasons this would be undesirable. A ladder would also need to be the right size to be of benefit. A ladder that is too tall or too short would present additional problems that would weigh against its use with different types of boats 130 that are lifted to different levels. Using a ladder on a dock would also present safety issues and perhaps a heightened risk of slipping or falling, not to mention that leaning a ladder onto a lifted boat could scratch or damage the boat. Some types of boats include integrated ladders that are part of the boat design, typically but not always on the rear platform to assist boaters getting into or out of the water away from the dock. Such integrated ladders are not helpful to access a raised boat, however, as they may not be easily accessible of a lifted boat and/or may require the type of risky climbing discussed above even if they could be accessed.

A use of steps or stairs on the dock 100 could also solve the issues above in safely allowing ingress or egress from the boat when in the fully raised position on the lift. Known step and stair assemblies, however, are too complicated, too large, too expensive, or too limited for safe and reliable use on the dock 100.

For example, the deck sections 104*a*, 104*b* in a typical dock are typically only about 3 feet wide in the width dimension W (FIG. 1), so conventional stair constructions steps that include steps that have a width of three feet or more are generally incompatible with the deck sections 104*a*, 104*b*. Further a distance between the posts 108 in the length dimension on the deck sections 104*a*, 104*b* may not accommodate conventional stair constructions either, in particular those wherein a length dimension of the stairs equals or exceeds a height dimension of the stairs. Many known step and stair assemblies will violate one or more of these constraints.

Additionally, many known step and stair assemblies are designed for indoor use rather than outdoor use and are therefore disadvantaged for outdoor use on a dock when exposed to the elements. Freestanding steps or stairs, and step ladders, that are not positively attached to the dock 100 would likewise be undesirable in that they could unexpectedly move or tip over when being used to access a lifted boat 130, presenting personal safety risks and possible damage to the boat 130. Custom designed and fabricated steps for specific dock configurations and for specific lift mechanism 120 and boat 130 combinations are possible but are not cost effective, and in many cases boat owners are restricted from making certain modifications to the dock 100, specifically with respect to drilling holes in the posts 108 to fasten anything to them.

Exemplary embodiments of inventive, economical step assemblies are described below that overcome these and other disadvantages and allow safe, convenient, and reliable ingress and egress to a fully lifted boat. The inventive step assemblies are advantageously prefabricated from weather resistant materials and are more or less universally used on and attached to virtually any dock configuration having a post near an access point of the lifted boat. The inventive step assemblies are easily installable to existing posts on a dock without having to drill holes in the posts. Fabrication methods, assembly methods and methods of use of the inventive step assemblies will be in part apparent and in part explicitly discussed in the following description.

Referring now to FIGS. 3-8 a prefabricated step assembly 200 according to an exemplary embodiment of the invention is shown that advantageously provides convenient access to a lifted boat 130 on a dock 100 without having to lower the boat 130, without climbing on the lift mechanism 120 or the boat 130, and without jumping to or from the deck 102. The step assembly 200 is provided in a compact, space saving configuration that works well on a dock 100, is relatively lightweight, is weather resistant, is affordable to manufacture, is easy to install, and is more or less universally usable with many different dock configurations. So long as the dock 100 includes at least one post 108 to fasten the step assembly 200 at one end thereof, as described further below, the step assembly 200 can be securely mounted and conveniently used to access a lifted boat 130.

The step assembly 200 generally includes, as shown in the Figures, a foot section 202, a support member 204, a head section 206, and a step member 208. Each of the foot section 202, support member 204, head section 206, and step member 208 are fabricated from a strong, weather resistant material such as, for example, powder-coated aluminum. The step assembly 200 is advantageously prefabricated to provide a one-piece unit for easy installation to a dock. The foot section 202, support member 204, head section 206, and step member 208 are for, example welded together in one embodiment. The prefabricated step assembly 200 may therefore be carried to the dock 100 as a pre-assembled unit and rather quickly installed at a desired location.

Powder-coated aluminum advantageously provides relatively high strength in a relatively lightweight package of the step assembly 200 while offering long life with little to no maintenance on the dock 100. It is appreciated, however, that materials other than powder-coated aluminum, including other metals and non-metallic materials (e.g., wood and heavy duty plastic materials suitable for outdoor installation) may likewise be utilized in other embodiments. Similarly, other types of connections besides welding may be used as desired to connect the parts 202, 204, 206, and 208 as shown, including but not limited to adhesives and fasteners such as nuts, bolts, screws or rivets.

While a prefabricated step assembly 200 is advantageous from the installation perspective, in alternative embodiments, the step assembly 200 could be provided as a kit of separate parts for assembly by an installer on site instead of being prefabricated. Also, one of more of the parts 202, 204, 206, and 208 could be combined as integral pieces instead of separate pieces in some embodiments to reduce the parts count for assembly and installation as a kit if desired. Various adaptations are possible in this regard. Certain material selections may facilitate a unitary, one piece construction of the step assembly 200 where no adhesives, fasteners or fastener techniques (e.g., welding) are required to join separately fabricated parts.

Figure 3:
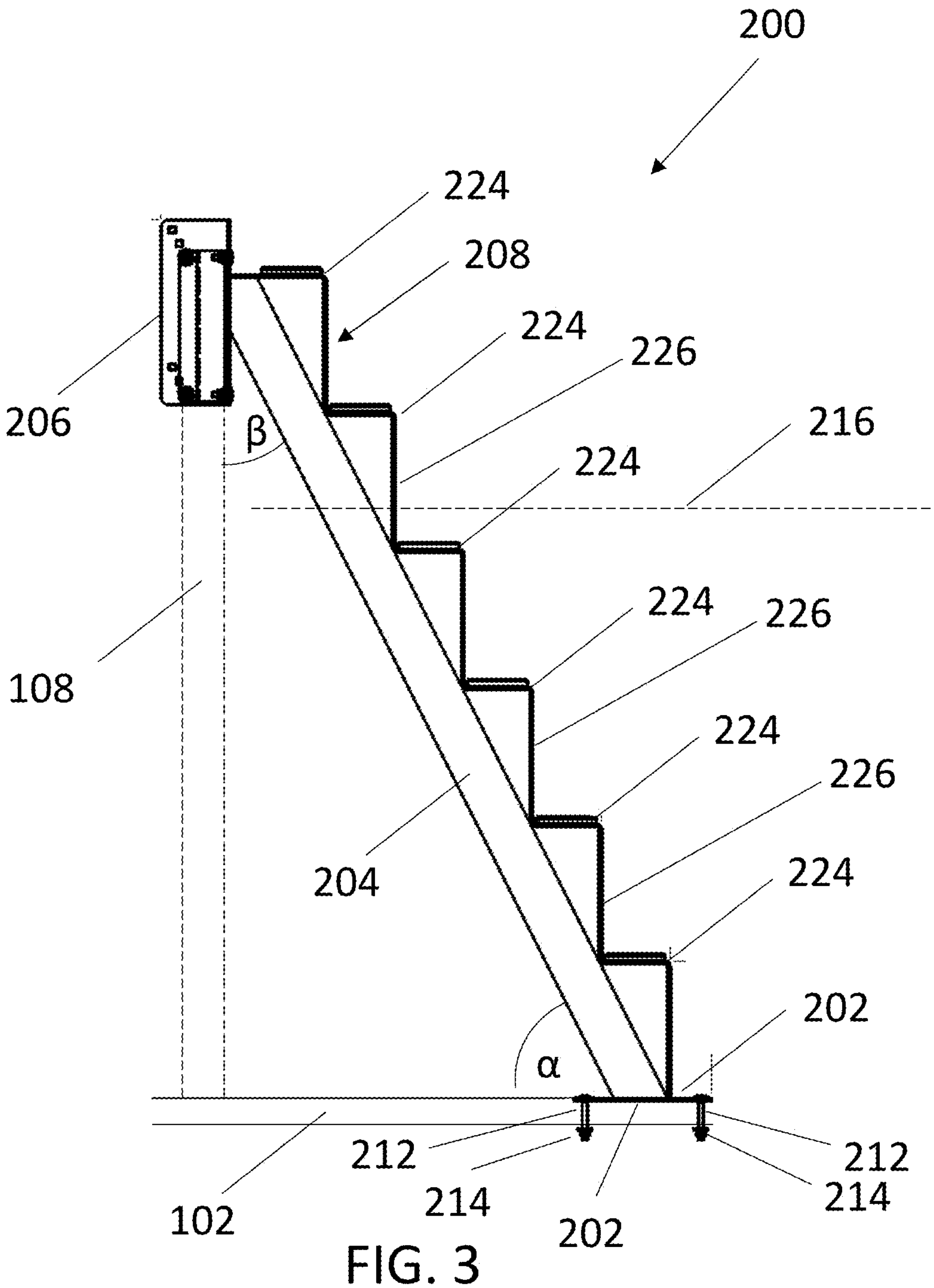
FIG. 3 is a side elevational view of a narrow ingress and egress step assembly according to an exemplary embodiment of the present invention for accessing the marine vessel while the lift is actuated to raise the marine vessel from the water.
Figure 7:
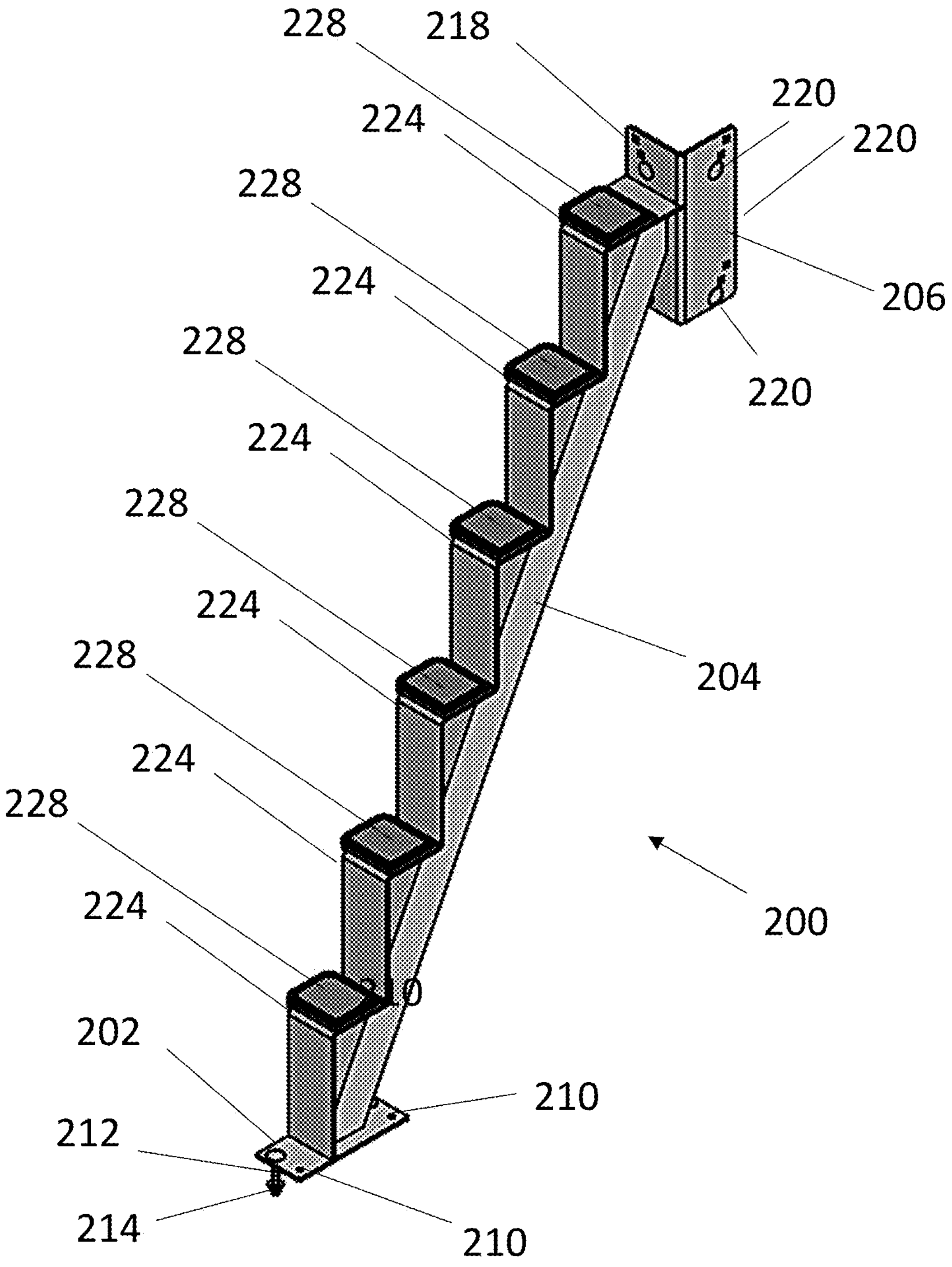
FIG. 7 is a second perspective view of the narrow ingress and egress step assembly shown in FIGS. 3 and 4.
Figure 8:
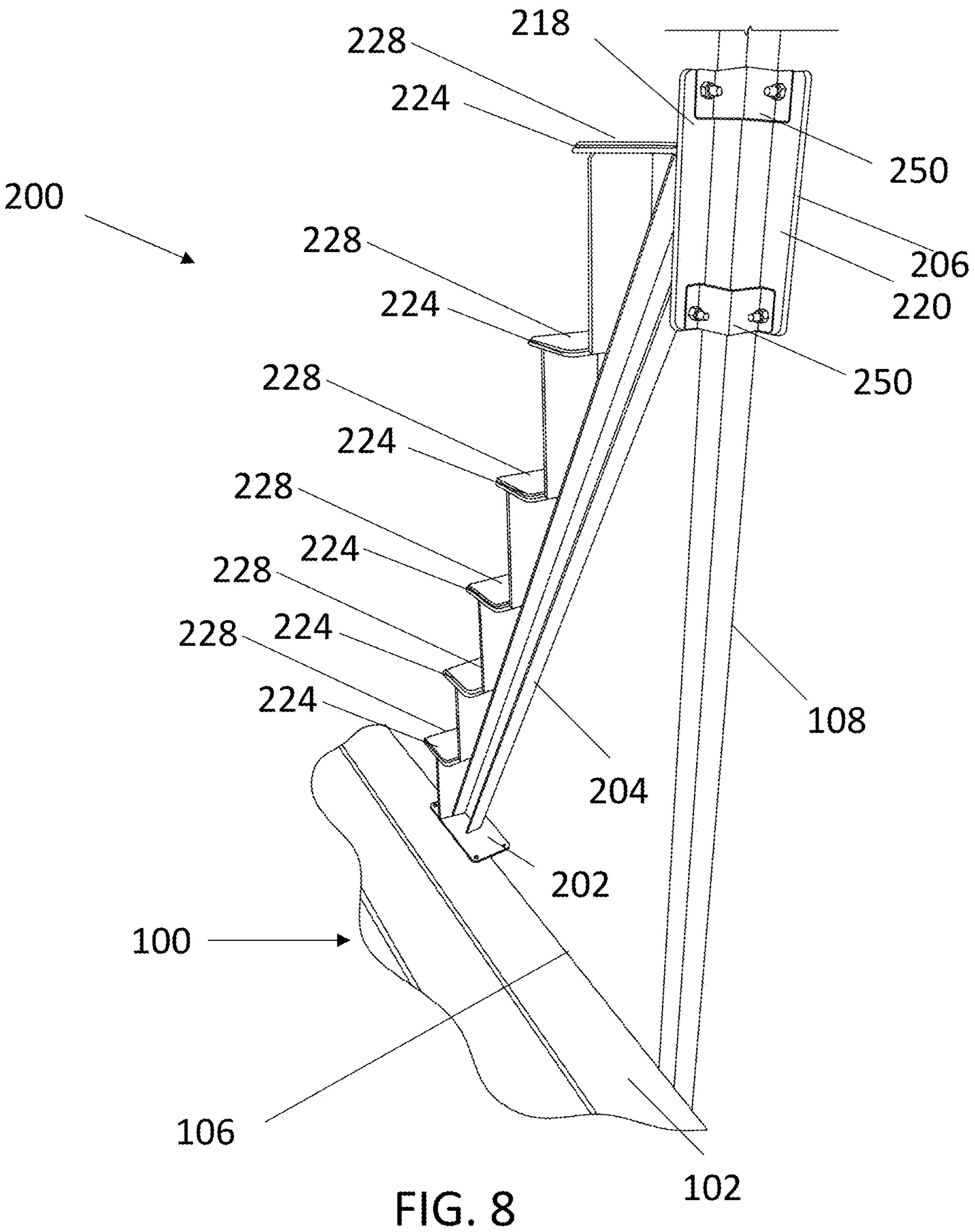
FIG. 8 is a partial view of the narrow ingress and egress step assembly attached to a dock post.

As shown by example in FIGS. 3 and 8, the foot section 202 is a flat plate that extends horizontally and seats upon the surface of the deck 102 (as defined by any of the deck sections 104*a*, 104*b*, 104*c* that likewise extend horizontally in the dock construction). The foot section 202 is provided with two pairs of mounting holes 210 (FIGS. 6 and 7) in the example shown, with one of the pairs of mounting holes 210 located on the forward end the other pair of mounting holes 210 at the rearward end. The mounting holes 210 may be selectively used to receive fasteners 212 (FIGS. 2, 3, 4, 5, 6, 7) such as bolts that may extend through holes in the deck 102 from above the top side deck 102 and be secured with, for example, nuts 214 to the bottom side of the deck 102. In contemplated embodiments, only two of the four fastener holes 210 are utilized to secure the foot section 202 to the deck 102, although this is not required in all installations. The user is provided with the choice of the four mounting holes 210 in the different locations to use in order to secure the foot section 202 to the deck 102. Of course, fasteners other than nuts and bolts may be used to attach the foot section 202 to the deck 102 if desired. Greater of fewer numbers of mounting holes 210 in the same or different locations than those shown are possible in other embodiments.

Figure 4:
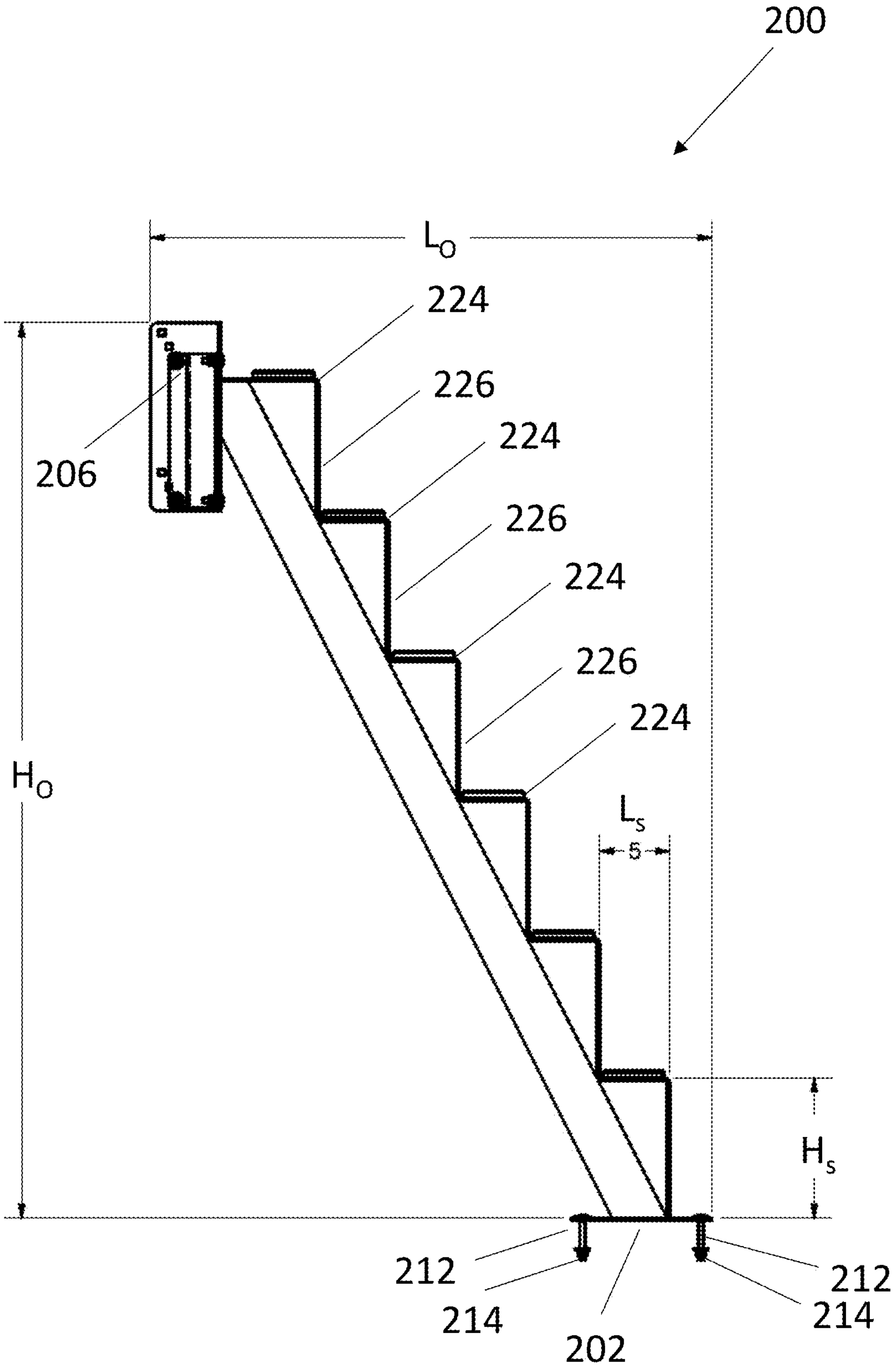
FIG. 4 is a view similar to FIG. 3 illustrating exemplary dimensional aspects of the narrow ingress and egress step assembly.

The support member 204, sometimes referred to as a spline, is provided as a single (i.e., only one) beam element that extends obliquely from the foot section 202 at an angle $\alpha$ (FIG. 3) of about 60° in the example shown. The angle $\alpha$ of about 60° imparts a relatively steep slope to the support member 204 such that an overall length dimension $L_o$ (FIG. 4) of the step assembly is much less than its height dimension $H_o$ (FIG. 4). In one example, the overall length dimension $L_o$ of the step assembly 200 is about 40 inches while the overall height dimension $H_o$ is about 64 inches. The smaller length dimension $L_o$ dimension occupies a relatively small amount of room between the posts 108 of the dock 100 in the direction L (FIG. 1) while the height dimension $H_o$ equals or exceeds the upper edge surface 216 (FIG. 3) of the boat 130 that a person needs to clear in order to ingress or egress the boat 130. In other embodiments, however, the angle $\alpha$ may range from about 50° to about 70°, and so may the dimensions $L_o$ and $H_o$.

Figure 6:
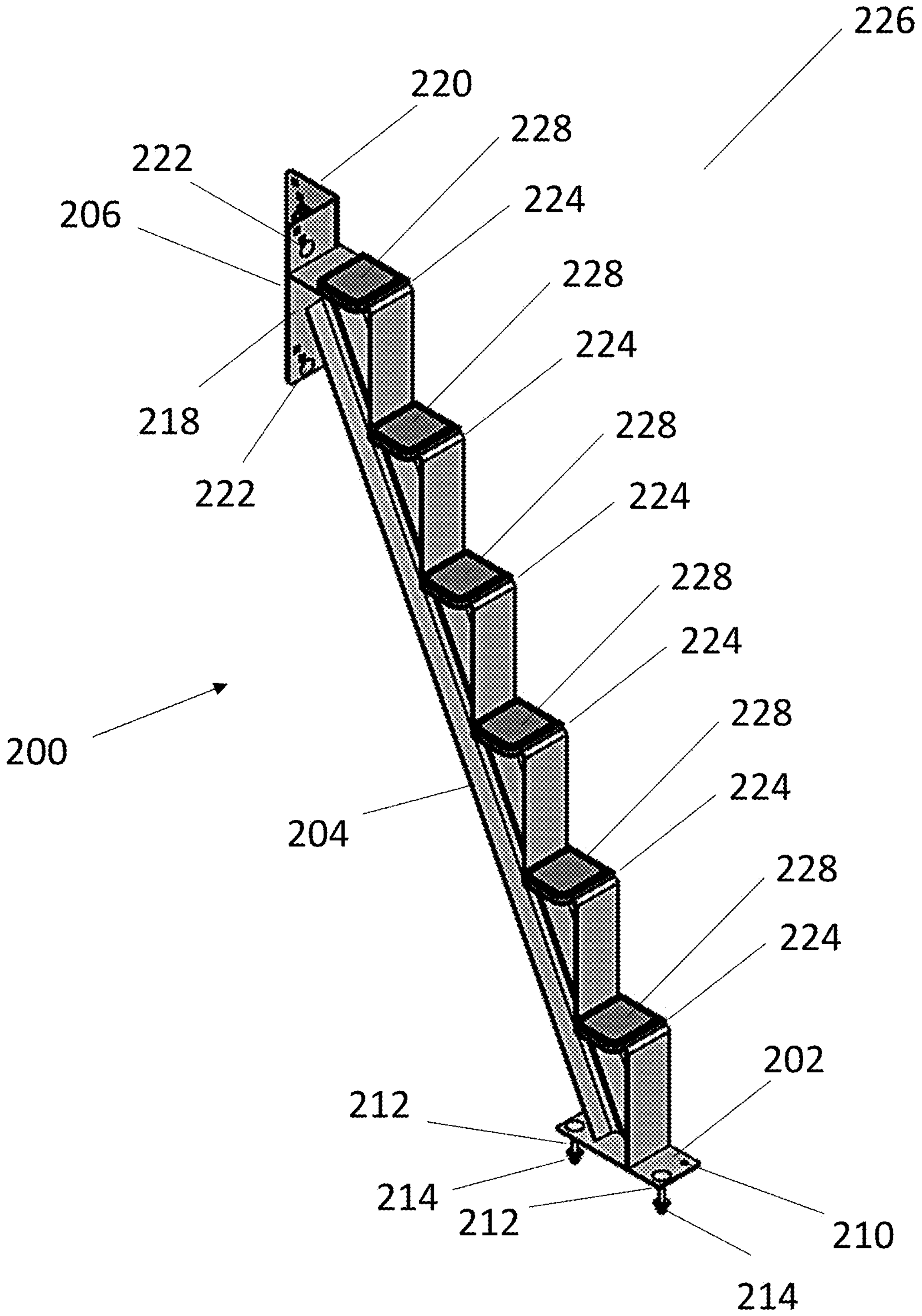
FIG. 6 is a first perspective view of the narrow ingress and egress step assembly shown in FIGS. 3 and 4.

The support member 204 interconnects the foot section 202 at a first distal end and the head section 206 at a second distal end thereof. As shown in FIGS. 6 and 8, the support member 204 is formed as an elongated beam having a U-shaped channel construction (i.e., having a U-shaped cross section). By virtue of only one support member 204 being present in the assembly, and further by virtue of the channel construction in the support member 204, the step assembly 200 is relatively small, relatively lightweight, and relatively cheaper relative to step assemblies having more than support member 204 and/or non-channel configurations of support members that would require a relatively greater amount of material in the construction of the step assembly 200. In another embodiment, the single support member 204 could have a different material-saving construction besides a U-channel beam, such as, for example only, an I-beam construction. Various adaptations are possible in this regard.

The head section 206 extends vertically from the angled support member 204 at the top end, and the head section 206 seats against the post 108 as shown in FIGS. 3 and 8. In the example shown, at the top end of the step assembly 200 the head section 206 extends at an angle $\beta$ (relative to the vertical axis of the post 108 that extends perpendicularly to the horizontal deck 102) of about 30°. The angle $\beta$ can of course vary with the angle $\alpha$ as described above in other embodiments. For example, angle $\beta$ may range from about 20° to about 40° in various embodiments. As described above, reducing the length $L_o$ of the step assembly 200 (FIG. 4) while realizing a desired height $H_o$ is preferred in many dock configurations, but where space permits the angle $\alpha$ and the angle $\beta$ may be about equal to provide a step assembly that is not as steep. Likewise, the angle $\beta$ in some cases may be greater than the angle $\alpha$ to provide an even shallower set of steps where space constraints are not as pressing. In this aspect, the benefits of the step assembly 200 may accrue to applications other than ingress or egress from a lifted boat that may not present the same space limitations as the dock application. The specific dimensions, angles and geometry of the step assembly 200 that is designed for ingress and egress of a lifted boat are therefore described for the sake of illustration rather than limitation.

As best shown in FIGS. 6-8, the head section 206 includes vertically elongated first and second plate sections 218, 220 that extend perpendicular to one another and are joined at a corner of the head section 206. Each plate section 218, 220 respectively incudes a pair of vertically aligned fastener openings 222. The plate sections 218, 220 can be seated on adjacent sides of the post 108 and wrap around the corner of the post 108. This configuration allows the head section 206 to be attached to the post 108 without any holes being drilled into the post or without utilizing any hole formed in the post 108 as described further below.

The step member 208 extends above and is attached to the single support member 204, either directly or indirectly through the foot section 202 and head section 206. In the illustrated example, the step member 208 is a unitary, single-piece step member integrally formed with a number of horizontally extending steps 224 that extend above the single support member 204. Vertical riser sections 226 extend between the horizontal steps 224 in the step member 208. In the example shown, and as seen in FIG. 4, the step member 208 includes six steps 224 are provided that each have a length dimension $L_s$ of about 5 inches as shown in FIG. 4 and that are vertically separated in the height dimension $H_s$ of about 10 inches. As such, the height of the steps 224 is about twice the length of the steps 224 to conserve room in the overall length dimension $L_o$ while allowing a person to rapidly ascend on the steps 224 to access the lifted boat 130.

The six steps 224 in step member 208 for the example shown and described allow a person starting from the deck 102 to ascend about six feet or about sixty inches from the lowest step to the highest step, a distance that is sufficient to ingress or egress the vast majority of boats 130 that are useable with lift mechanisms 120. As shown in FIG. 3, all of the steps 224 provided may not be needed to access the upper edge 216 of a given lifted boat 130. Different combinations of lift mechanisms 120 and boats 130 means that the upper edge 216 may be higher or lower relative to the deck 102 but the step assembly 200 can be used to access all of them.

In some contemplated examples, however, because some types of boats such as, for example, pontoon boats, are not raised as high as other types of boats (i.e., the upper edge 216) will sit lower when the pontoon boat is lifted) another version of the step assembly 200 may include three steps 224 instead of six with dimensions $H_o$ and $L_o$ that are about ½ of those described, but with similar angles $\alpha$ and $\beta$. As such, a person starting from the deck 102 could ascend about 2.5 feet or about 30 inches from the lowest step to the highest step, a distance that is sufficient to ingress or egress the vast majority of pontoon boats 130 that are useable with lift mechanisms 120. Of course, additional versions of steps assemblies having varying number of steps, whether odd or even numbers of steps, are possible to optimize the step assemblies for universal needs with different types of watercraft.

Figure 5:
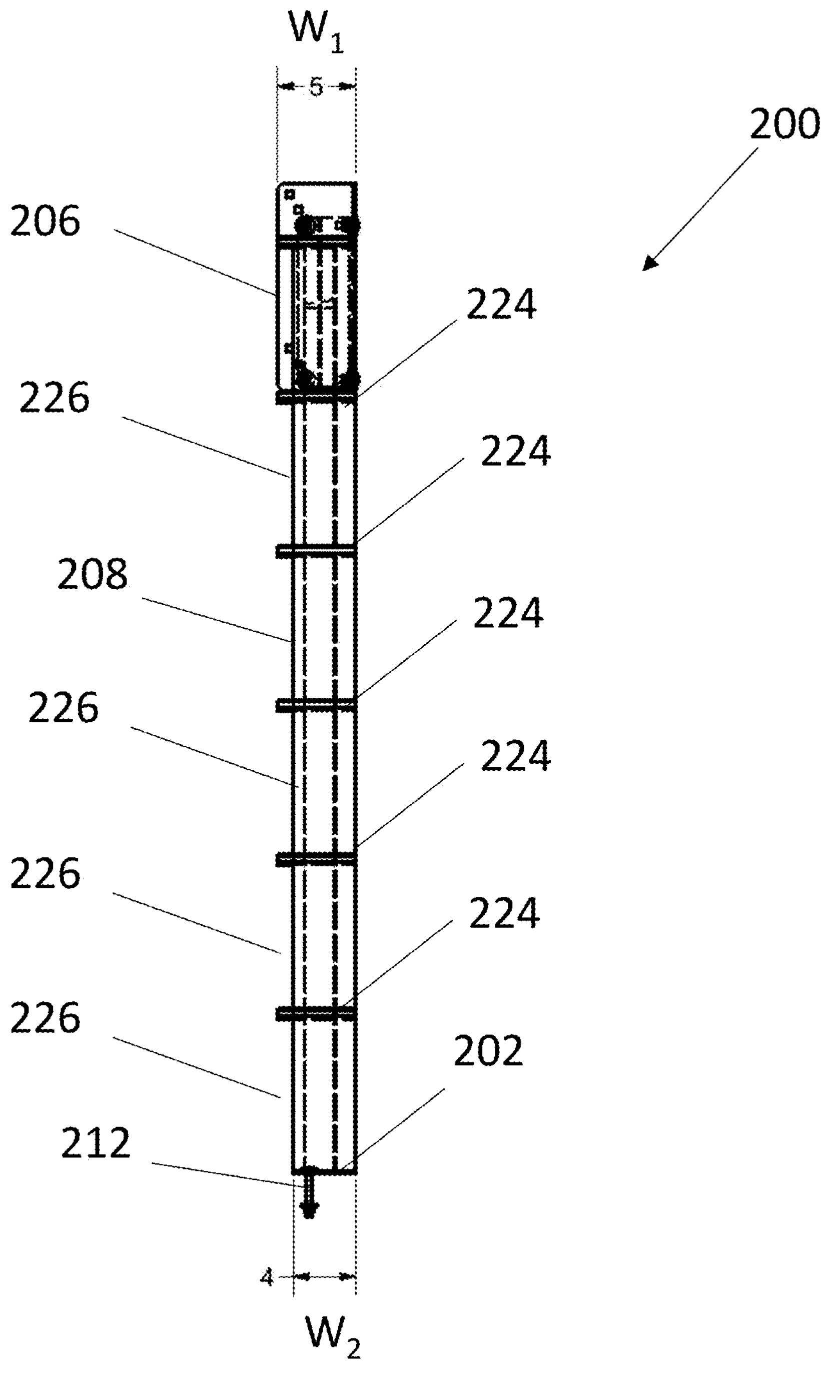
FIG. 5 is a front elevational view of the narrow ingress and egress step assembly shown in FIGS. 3 and 4.

As shown in FIG. 5, in the width dimension, the horizontal steps 224 have a width $W_1$ of about 5 inches, which exceeds a width $W_2$ of the vertical riser sections 226 extending in between the steps 224. As such, the horizontal steps 224 overhang the support member 204 on one side as shown in FIGS. 5, 6 and 7. The one inch overhang allows a relatively larger step surface, while the reduced width of the riser sections 226 reduces material and weight of the step assembly 200 to lower the cost of fabrication and to provide an easier installation of the step assembly 200. In the illustrated example, the step overhang extends on only one of the two sides of the step member 208, while in another embodiments the steps 224 could be substantially centered on the step member 208 with an equal overhang on both sides. In still other embodiments, step overhanging may be considered optional and need not be provided.

The small width dimensions $W_1$ and $W_2$ in the step member, which each exceed the width dimension of the support member 204 as shown in the Figures, are highly advantageous in the dock installation. As shown in FIG. 8, for example, when the step assembly 200 is oriented to extend along an edge of the slip 106 on the dock 100, the step assembly 200 at most occupies 4 inches on the edge of the deck 102 and therefore most of the width of the deck 102 (e.g., 36 inches) is unobstructed by the step assembly 200 so that persons associated with the boat owner or a neighboring boat owner for an adjacent slip on the dock can easily walk by the step assembly 200 or have plenty of room to place items on the deck 102 adjacent to the step assembly 200. As such, the step assembly 200 is advantageously narrow in the width dimension for use on relatively narrow deck sections such as the dock sections 104*a*, 104*b* described above.

Further, when as shown in FIG. 8 the foot section is mounted to the deck 102 in a manner that itself slightly overhangs the edge of the deck 102 adjacent the slip 106, further space savings in the width dimension on the deck 102 may result. Meanwhile, the overhang of the steps 224 desirably extends on the slip-side of the step assembly 200 so that steps 224 are positioned slightly closer to the lifted boat 130 than they would be if no overhang was present. In other words, the 1 inch overhang of each steps 224 faces away from the dock 100 and toward the lifted boat 130, such that the overhanging steps are positioned away from persons on the deck 102 walking by the step assembly 200. Persons on the deck 102 are therefore preventing from inadvertently bumping into or being snagged on one of the overhanging steps 224 while walking by. The side of the steps 224 facing the dock 100 and persons walking by are flush with the edges of the riser sections 226 such that no portion of the step protrudes on that side.

In this aspect, different versions of step assemblies 200 may be provided having overhanging steps on different sides of the of the step member 208 for mounting on different sides of dock slips 106 with the overhanging steps facing the boat 130. In other words, left and right-hand versions of the step assembly may be made available to boat owners, with the boat owner selecting the left-hand version or right-hand version depending on the availability of posts 108 on the respective sides of the slip 106 in the dock 100. FIG. 5 shows a left-hand versions wherein the steps 224 overhang the left side edges of the vertical riser sections 226, while the right hand version would include steps 226 overhanging the right side edges. Of course, if desired a boat owner could install step assemblies 200 on both sides of a dock slip 106 to ensure possible ingress or egress on each side of the boat 130.

The horizontal steps 224 in the example shown are about 5 inches by 5 inches square to provide a step surface large enough for ingress and egress purposes to the raised boat 130 but while otherwise preserving the narrow width of the step assembly 300 so that it occupies a minimal amount of space on the dock 100 in the width dimension. The dimensions of the steps 224 and the vertical separation of the steps 224 may, however, be varied in further and/or alternative embodiments. In uses other than ingress or egress of lifted boats, the narrow width dimension may not be as important from the space saving perspective, but the narrow width dimensions are an aspect of the lightweight assembly using a reduced amount of material and therefore advantageously reduces the cost of fabrication of the step assembly 200.

Each step 224 in the step assembly 200 further includes an attached tread element 228 having a non-slip surface as shown in FIGS. 6-8. A variety of non-slip tread elements are known and may be used to improve traction for the safety of a user of the step. In one contemplated embodiment, the tread elements are foam elements that provide non-slip surfacing as well as some degree of padding for the comfort of the user relative to a harder surface of the powder-coated steps. In alternative embodiments, the tread elements 226 could be considered optional and need not be used.

Figure 9:
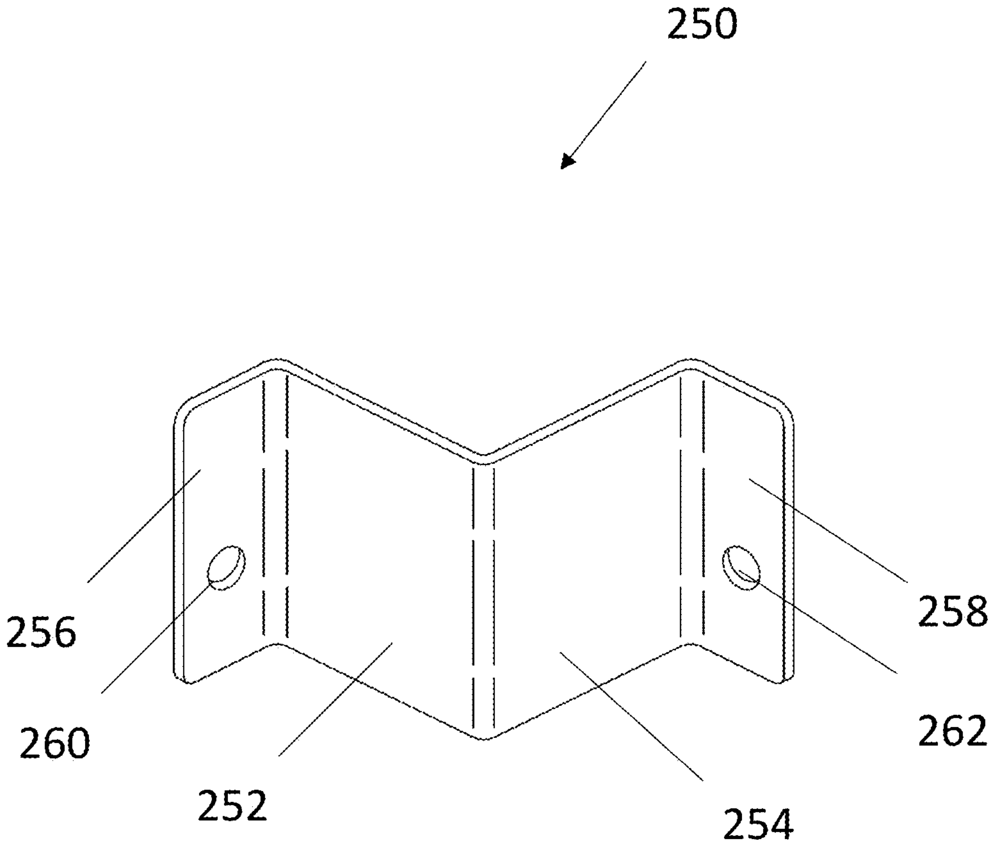
FIG. 9 is a perspective view of an exemplary attachment bracket for the narrow ingress and egress step assembly.

FIG. 8 illustrates the head section 206 of the step assembly 200 attached to the post 108 with separately provided brackets 250 and fasteners. FIG. 9 illustrates the mounting bracket 250 construction. Each mounting bracket 250 includes flat plate sections 252, 254 extending perpendicularly to one another and joined at a corner. Flanges 256, 258 extend from each edge of the plate sections 252, 254 in manner that is respectively perpendicular to the plane of the flat plate sections 252, 254. Fastener holes 260, 262 are formed in each flange 256, 258. The brackets 250 may be fabricated from a metal material in one example, although other materials could likewise be used.

As shown in FIG. 8, the plate sections 218, 220 of the head section receive one corner of the post and cover two adjacent sides of the post 108, with the side edges of the plate sections 218 and 220 extending beyond the corresponding edges of the post 120. The brackets 250 receive the opposite corner of the post and cover the remaining two sides of the post 108, with the flanges 256, 258 extending outwardly to engage the protruding edges of the plate sections 218, 220. The mounting holes in the brackets 250 and in the plate sections 218, 200 of the head section 206 are aligned with one another, and fasteners such as nuts and bolts are used to attach the bracket flanges 262 to the head section plates 218, 220. The mounting brackets 250 and the vertically extending head section 206 in combination surround an exterior of the post 108 and attach to one another via the fasteners, without the fasteners directly attaching to the post 108. As such, no holes in the post 108 are required to install the step assembly 200, and none of the fasteners penetrate the posts 108. This is advantageous for dock installations wherein boat owners are restricted from making any modifications to the posts 108 of the dock.

In the illustrated embodiment, each mounting bracket 250 surrounds about ½ of the post 108 and the head section 206 surrounds about ½ of the support post 108. In another embodiment, however, each mounting bracket 250 and head section 206 may surround greater than two sides (e.g., three sides) of the post 108 with the other extending over only side of the post 108. In typical dock installations, the posts 108 are square posts having dimensions of about 2.5 inches by about 2.5 inches. The mounting brackets 250 and head section 206 are therefore dimensioned to receive and surround the 2.5 inch×2.5 inch post and attach thereto as shown.

In another installation, the same brackets 250 and head section 206 could be mounted to a smaller post 108 (e.g., a 2 inch by 2 inch square post) by inserting shims (not shown) between the head section 206 and/or the mounting brackets 250. In various alternative embodiments, the dimensions of the head section 206 and mounting brackets 250 could also vary to accommodate posts larger than, for example, 2.5 inch posts. It should be understood that posts 108 may be provided on a dock for purposes other than supporting a roof in some cases, and still further (in dock and non-dock installations) posts 108 may exist or be provided that can serve to attach and support the step assembly 200 and therefore may be eligible as a "support post" for attachment to the step assembly 200. The step assembly can be used to retrofit any desired location with steps for the benefit of persons navigating between higher and lower elevations.

While the mounting brackets 250 are advantageous to secure and support the head section 206 to a post 108 in a dock 100 without fasteners that penetrate the posts 108, in cases where a boat owner is not restricted from drilling holes in the posts or making modifications, the head section 206 could be directly attached to the post without the mounting brackets 250. Also, while two mounting brackets 250 are shown in FIG. 8, greater or fewer numbers of mounting brackets 250 may be provided in alternative embodiments. Finally, while an exemplary geometry and configuration of mounting bracket 250 has been shown and described, alternative geometries and configurations of mounting brackets is possible in other embodiments.

Figure 10:
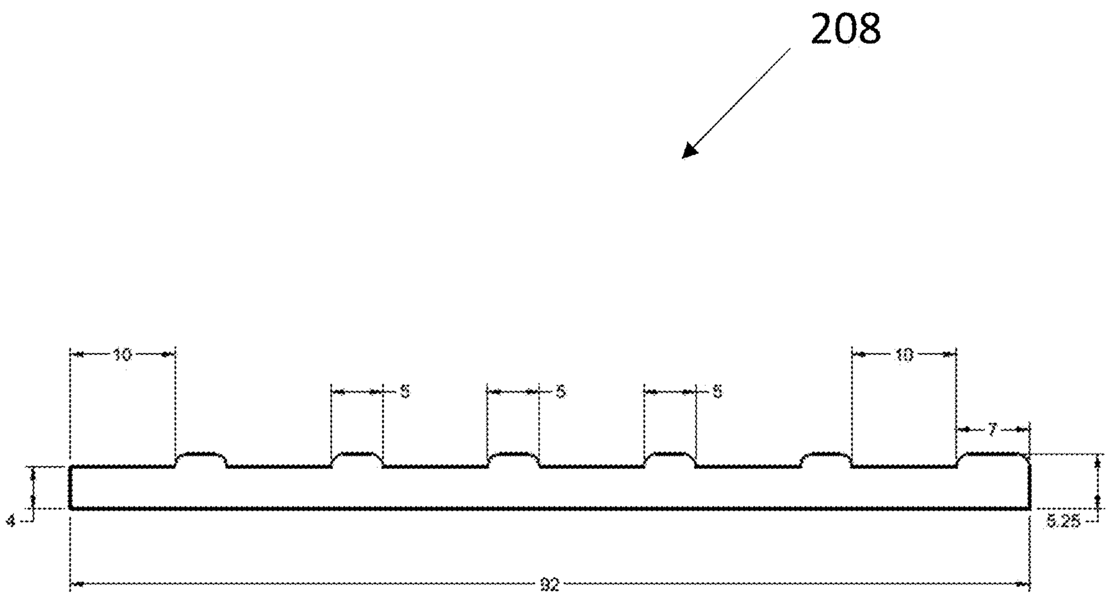
FIG. 10 is a top plan view of a step member fabrication for the narrow ingress and egress step assembly.

FIG. 10 shows the step member 208 prior to being formed with the steps 224 and riser sections 226 shown in FIGS. 3, 4 and 5-8. The step member 208 is a flat and planar with increased width sections that will become the overhanging steps 224 when the step member 208 is bent to define the integral steps and riser sections. The dimensions shown in the step member 208 are exemplary only and may be varied in different embodiments of step assemblies. The formation of the integral steps from one flat piece of material avoids a more complicated and costly fabrication requiring separately provided steps and/or risers that may otherwise need to be attached to the frame of the step assembly via welding techniques or via fasteners.

Figure 11:
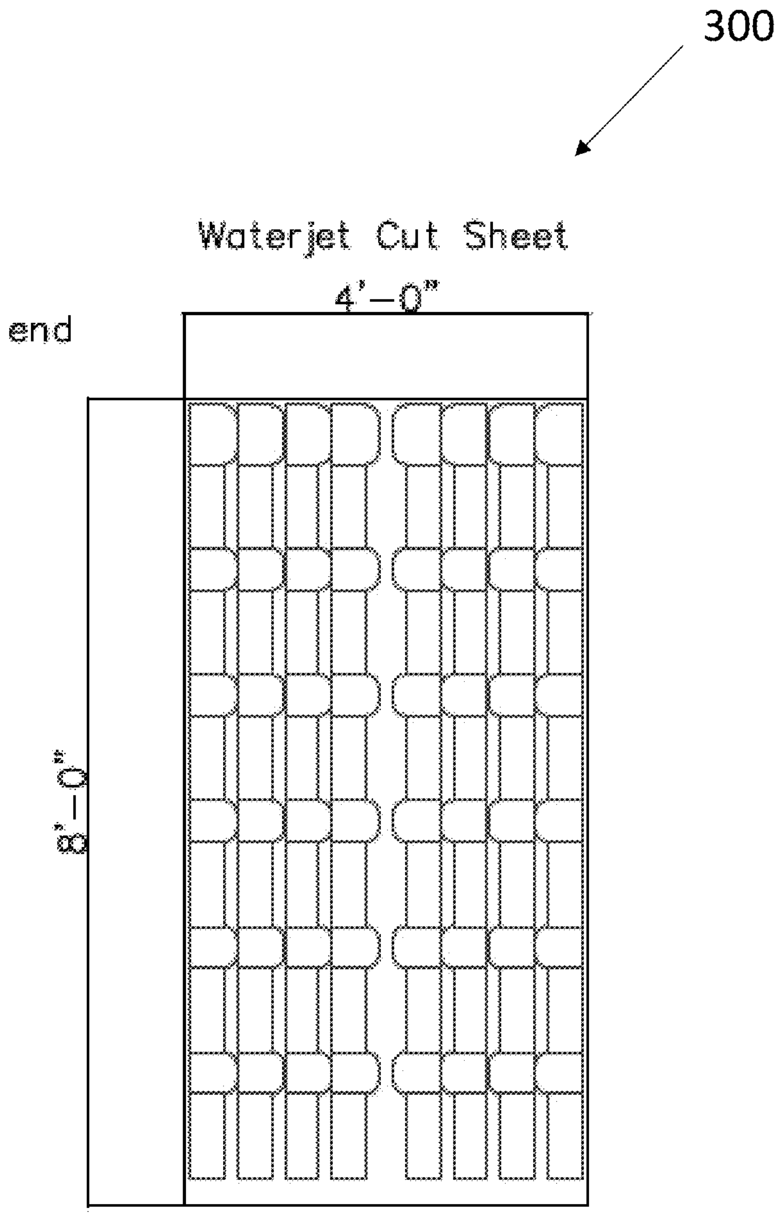
FIG. 11 illustrates a fabrication of step members shown in FIG. 10.

FIG. 11 shows a sheet of metal 300 from which a plurality of step members 208 may be cut using, for example, a waterjet process. In the example shown, eight step members 208 can be cut from a single 4 foot by 8 foot piece of material (e.g., aluminum in contemplated examples). Batch formation of step members is therefore possible in a cost effective manner with reduced amounts of scrap material.

In a contemplated method of manufacture, step members 208 are water jetted out of a flat sheet of, for example, 5052 aluminum (FIG. 8). Each step member 208 (FIG. 10) is then bent to define the integral steps 224 and risers 226 in the step member 208 (FIGS. 3-8).

Foot sections 202 (FIGS. 3-8) may likewise be water jetted out of a flat sheet of 5052 aluminum.

Support members 204 (FIGS. 3-8) may be cut to the correct angles on the ends and to the correct length. Longer beams of material may be utilized to fabricate the support members 204 in batch processing.

Head sections 206 (FIGS. 3-8) are cut to length from flat aluminum stock, and bent into the shape shown and described above to allow it to fit around the post 108 and be attached thereto with mounting brackets 250 as described above. The mounting brackets 250 may likewise be cut from flat material stock and bent into the shape shown.

After being bent, each of the fabricated step members 208 is attached to one of the support members 204 via, for example, welding. One of the fabricated head sections 206 and one of the fabricated foot sections 202 is then attached to the respective distal ends support member 204 via, for example, welding. The entire assembly is then powder-coated in a desired color. After powder-coating the foam treads 228 are installed to complete each step assembly 200.

The step assembly 200 may be provided in kit form with the mounting brackets 250, fasteners for the foot section 202 and the head section 206 needed for installation, and shims that may be needed depending on the sizes of the posts 108 available in any given installation. Alternatively, the mounting brackets 250, fasteners, and shims could be provided separately.

The step assembly 200 may be easily installed on a boat dock 100 by engaging the head section 206 to a post 108 with the foot portion 202 seated upon the deck 102, attaching the head section 206 to the post 108 with the mounting brackets 250 and fasteners, and attaching the foot section 202 to the deck 102 with the fasteners as shown in FIGS. 3 and 8. Once installed, the step assembly 200 is firmly and securely supported at its top end and at its bottom end such that it cannot move or tip when ascended or descended by a person to assist in the ingress or egress of the lifted boat that is otherwise risky. Also, the step assembly 200 is secured and fixed in place at a distance from the lift mechanism 120 and boat 130 at all times, so the step assembly 200 cannot scratch or damage the lift mechanism 120 and/or boat 130 in use.

The step assembly 200 can likewise be easily removed when desired via detaching the support brackets 250 from the head section 206 and removing the fasteners from the foot section 202. Boat owners can remove the step assembly 300 out of season if desired, or can easily move the step assembly 200 to another slip 106 or to another location on the dock 100, or to another dock 100. For example, if the owner replaces a boat or the boat lift the location of the step assembly 200 may need to be moved to more optimally access the lifted boat in the same slip 106 or in a different one on the same or different dock 100. Likewise, if the boat 130 is moved from one body of water to another the owner can remove the step assembly 100 from the old dock and install it on the new dock if desired.

The advantages of the invention are now believed to have been amply illustrated in relation to the exemplary embodiments disclosed.

An embodiment of a step assembly has been disclosed including a horizontally extending mounting foot section, a vertically extending head section, a single sloping support member interconnecting the mounting foot section and head section, and a step member having a number of integrally formed horizontal steps extending above and attached to the single sloping support member.

Optionally, the step assembly may be fabricated from powder coated aluminum. The support member may extends at about a 60° angle from the horizontally extending mounting foot section. The number of integrally formed steps may be vertically distanced about 10 inches from one another in the step member. The number of integrally formed horizontal steps may be substantially square steps, which may be about 5 inches by about 5 inches.

As further options, the step member may also integrally formed vertical sections extending between the horizontal steps. A width of the integrally formed vertical sections may be less than a width of the horizontal steps. A width of the integrally formed vertical may be about 4 inches.

The single sloping support member may be an elongated channel member. The step member may be formed by water jetting. The vertically extending head section may include first and second plate sections extending perpendicularly to one another.

A mounting bracket may be attachable to the vertically extending head section. The mounting bracket and the vertically extending head section may surround an exterior of a support post, and more specifically may each surround about ½ of the support post. The mounting bracket and the vertically extending head section may be attachable to one another without penetrating the support post. The support post may be attached to a dock. The support post may be attached to a roof covering the dock.

The horizontal steps may be configured to facilitate access to a raised boat on a lift. The step assembly may be about 64 inches high and about 40 inches long.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A retrofit step assembly for accessing a lifted boat from a narrow boat dock, the retrofit step assembly comprising:
- a prefabricated, one piece unit comprising:
  - a horizontally extending mounting foot section to be seated on a horizontal deck of the narrow boat dock;
  - a vertically extending head section attachable to a vertical support post of the narrow boat dock;
  - a single sloping support member interconnecting the mounting foot section and head section; and
  - an integrally formed narrow step member having a number of horizontal steps and vertical risers extending between the horizontal steps, wherein the integrally formed step member extends above the single sloping support member and provides retrofit access to the lifted boat.

2. The retrofit step assembly of claim 1, wherein the prefabricated, one piece unit is fabricated from powder coated aluminum.

3. The retrofit step assembly of claim 1, wherein the single sloping support member extends at about a 60° angle from the horizontally extending mounting foot section.

4. The retrofit step assembly of claim 1, wherein the number of risers extend vertically about 10 inches between the horizontal steps in the integrally formed step member.

5. The retrofit step assembly of claim 1, wherein the number of horizontal steps are substantially square steps.

6. The retrofit step assembly of claim 5, wherein the substantially square steps are about 5 inches by about 5 inches.

7. The retrofit step assembly of claim 1, wherein a width of the vertical risers is less than a width of the horizontal steps.

8. The retrofit step assembly of claim 7, wherein a width of the vertical risers is about 4 inches.

9. The retrofit step assembly of claim 1, wherein the single sloping support member comprises an elongated channel member.

10. The retrofit step assembly of claim 1, wherein the vertically extending head section comprises first and second plate sections extending perpendicularly to one another.

11. The retrofit step assembly of claim 1, further comprising a mounting bracket attachable to the vertically extending head section.

12. The retrofit step assembly of claim 11, wherein the mounting bracket and the vertically extending head section surround an exterior of the vertical support post.

13. The retrofit step assembly of claim 12, wherein each of the mounting bracket and the vertically extending head section surround about ½ of the vertical support post.

14. The retrofit step assembly of claim 12, wherein the mounting bracket and the vertically extending head section are attachable to one another without penetrating the vertical support post.

15. The retrofit step assembly of claim 1, wherein the prefabricated, one piece unit is about 64 inches high and about 40 inches long.

16. The retrofit step assembly of claim 1, wherein each of the horizontal steps overhang the single sloping support member on only one side of the single sloping support member.

17. The retrofit step assembly of claim 16, wherein each of the horizontal steps overhang only a left hand side of the single sloping support member.

18. The retrofit step assembly of claim 16, wherein each of the horizontal steps overhang only a right hand side of the single sloping support member.

19. The retrofit step assembly of claim 1, further comprising a non-slip tread element on at least one of the horizontal steps.

20. The retrofit step assembly of claim 1, wherein a height dimension of the vertical risers is about twice a length dimension of the horizontal steps.

* * * * *